(12) United States Patent
Cheng et al.

(10) Patent No.: US 8,756,679 B2
(45) Date of Patent: Jun. 17, 2014

(54) ELECTRONIC DEVICE AND METHOD FOR UNLOCKING LOCKED OPERATING SYSTEM

(71) Applicants: Rong-Feng Cheng, Shenzhen (CN); Jin-Long Li, Shenzhen (CN); Hai-Sheng Li, Shenzhen (CN); Chih-San Chiang, New Taipei (TW)

(72) Inventors: Rong-Feng Cheng, Shenzhen (CN); Jin-Long Li, Shenzhen (CN); Hai-Sheng Li, Shenzhen (CN); Chih-San Chiang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/646,849

(22) Filed: Oct. 8, 2012

(65) Prior Publication Data

US 2013/0145458 A1 Jun. 6, 2013

(30) Foreign Application Priority Data

Dec. 2, 2011 (CN) .......................... 2011 1 0394964

(51) Int. Cl.
*G06F 21/34* (2013.01)

(52) U.S. Cl.
USPC .......................................................... 726/19

(58) Field of Classification Search
USPC ............................................................ 726/19
See application file for complete search history.

(56) References Cited

U.S. PATENT DOCUMENTS

| 6,067,625 A * | 5/2000 | Ryu ................................. 726/18 |
| 6,742,129 B1 * | 5/2004 | Higgs et al. ....................... 726/19 |
| 2006/0041932 A1 * | 2/2006 | Cromer et al. ..................... 726/6 |
| 2013/0151857 A1 * | 6/2013 | Agrawal ........................ 713/178 |

FOREIGN PATENT DOCUMENTS

CN 101997678 A 3/2011

* cited by examiner

*Primary Examiner* — William Powers
(74) *Attorney, Agent, or Firm* — Novak Druce Connolly Bove + Quigg LLP

(57) ABSTRACT

A method for unlocking a locked operating system of an electronic device is provided. The electronic device includes a storage unit and a locking unit, the storage unit is configured for storing a preset password and preset unlocking request information. The method includes steps: receiving a message from a second electronic device; verifying the received message according to the preset unlocking request information; and sending the preset password to the second electronic device if the verification is successful.

13 Claims, 3 Drawing Sheets

ELECTRONIC DEVICE AND METHOD FOR UNLOCKING LOCKED OPERATING SYSTEM

BACKGROUND

1. Technical Field

The present disclosure relates to the data security field and, particularly, to an electronic device capable of unlocking a locked operating system and a method for unlocking locked operating system of the electronic device.

2. Description of Related Art

Users usually set a password consisted of a series of numbers, letters, or symbols, to lock an operating system of their terminals, such as mobile phone, tablet computer for example, in order to ensure the data stored in the terminals is secure. However, users must remember the password, if they forget the password, they cannot enter the operating system of their terminals themselves.

Therefore, an electronic device and a method for unlocking the operating system of the electronic device are needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
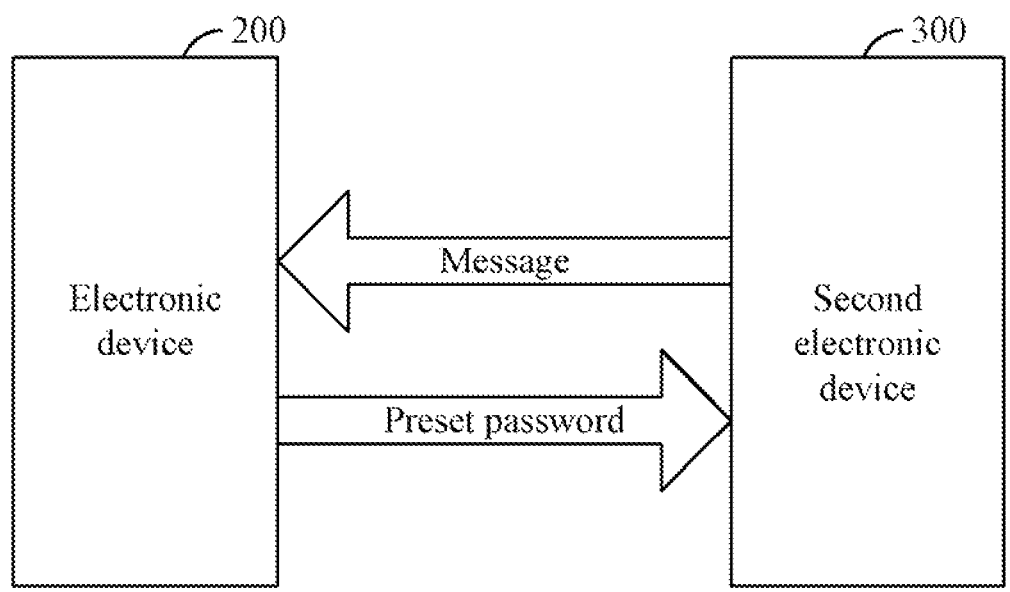
FIG. 1 is a schematic view of unlocking a locked operating system of an electronic device, according to an embodiment.
Figure 2:
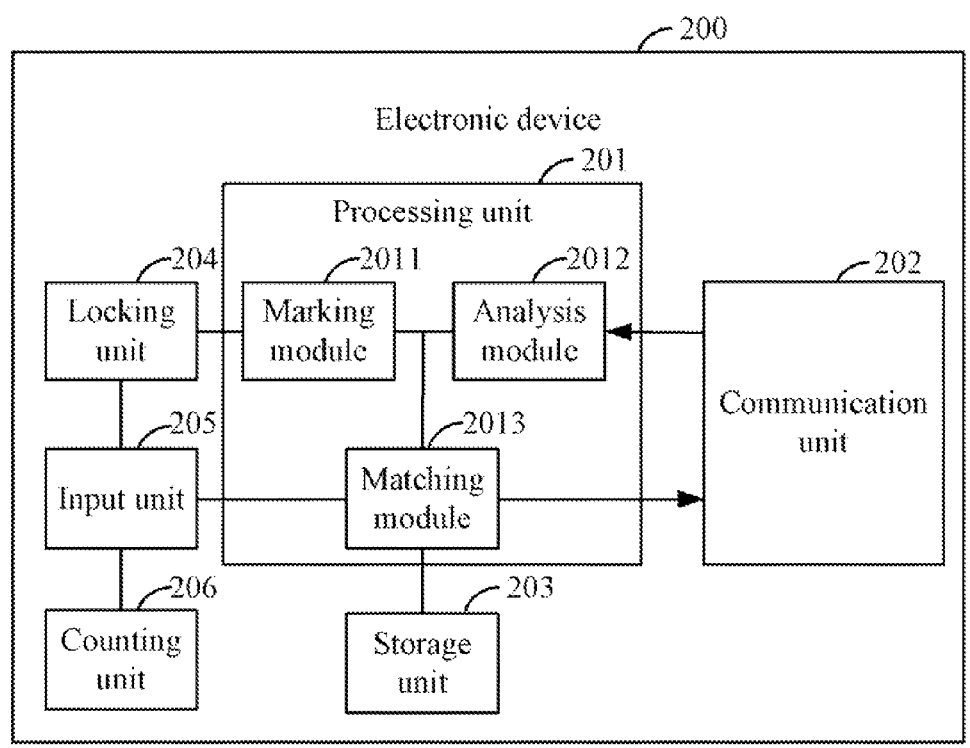
FIG. 2 is a block diagram of the electronic device of FIG. 1.

Referring to FIGS. 1 and 2, an electronic device 200 is provided. The electronic device 200 includes but not limited to mobile phone, PDA, notebook computer, tablet computer, for example. The electronic device 200 includes a processing unit 201, a communication unit 202, a storage unit 203, a locking unit 204 and an input unit 205. The processing unit 201 communicates with a second electronic device 300 (such as mobile phone) through the communication unit 202. The locking unit 204 is configured for locking or unlocking an operating system of the electronic device 200. The storage unit 203 stores a preset password and preset unlocking request information. The input unit 205 is configured to receive information, such as an input password from user.

If the operating system of the electronic device 200 is locked, and a unlocking procedure for the operating system times out, such as, user inputs wrong passwords many times, if the communication unit 202 receives a message from the second electronic device 300, the processing unit 201 parses the content of the message, and verify the content of the received message according to the preset unlocking request information, if the verification is successful, the processing unit 201 controls the communication unit 202 to send the preset password to the second electronic device 300, to remind the user of the second electronic device 300 the preset password to unlock the locked operating system of the electronic device 200.

In the embodiment, the processing unit 201 includes a marking module 2011, an analysis module 2012 and a matching module 2013. The analysis module 2012 is used to parse the content of the received message. The matching module 2013 is used to verify the parsed content of the received message according to the preset unlocking request information stored in the storage unit 203, and determines whether the parsed content of the received message matches with the preset unlocking request information stored in the storage unit 203. In the embodiment, the preset unlocking request information includes a preset communication number and a preset string, the parsed content of the received message includes a communication number of the second electronic device 300 and a string, the matching module 2013 compares the communication number and the string included in the parsed content of the received message with the preset communication number and the preset string respectively. If the communication number and the string included in the parsed content of the received message match with the preset communication number and the preset string stored in the electronic device 200 respectively, the processing unit 201 controls the communication unit 202 to send the preset password to the second electronic device 300 having the preset communication number.

The electronic device 200 further includes a counting unit 206 configured to record a number of times that a user inputs wrong passwords. The marking module 2011 is used to mark a timeout flag on the locking unit 204, if the recorded number of times reaches a predetermined number; and clear the timeout flag from the locking unit 204, if the verification is successful.

Figure 3:
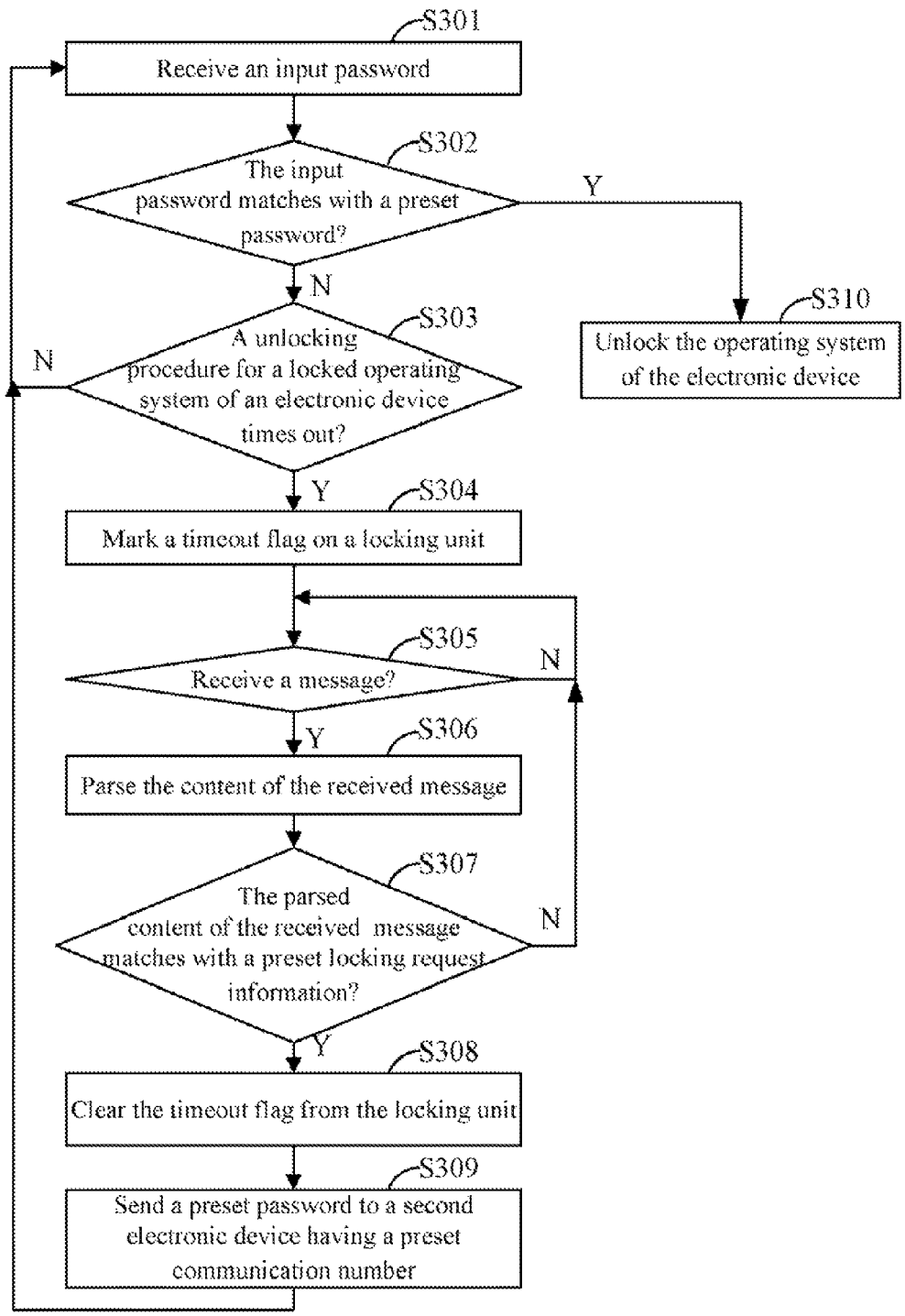
FIG. 3 is a flowchart illustrating a method for unlocking the locked operating system of the electronic device of FIG. 1.

Referring to FIG. 3, is a flowchart illustrating a method for unlocking the operating system of the electronic device 200. In the embodiment, the operating system of the electronic device 200 has been locked in an initial state.

In step S301, the input unit 205 receives an input password from user.

In step S302, the matching module 2013 compares the input password with the preset password stored in the storage unit 203, and determines whether the input password matches with the preset password. If the input password matches with the preset password, the procedure goes to step S310, otherwise the procedure goes to step S303.

In step S303, the counting unit 206 records a number of times that a user inputs wrong passwords, and determines whether the recorded number reaches a predetermined number, that is, determines whether the unlocking procedure for the locked operating system of the electronic device 200 times out. If the recorded number reaches a predetermined number, namely, the unlocking procedure times out, the procedure goes to step S304, otherwise the procedure returns to step S301.

In step S304, the marking module 2011 marks a timeout flag on the locking unit 204. If the locking unit 204 is marked with a timeout flag, the locking unit 204 cannot unlock the operating system of the electronic device 200 even if user inputs a correct password. If the operating system of the electronic device 200 is locked but the locking unit 204 is not marked with a timeout flag, the user can input password again to unlock the locked operating system of the electronic device 200.

In step S305, the processing unit 201 determines whether the communication unit 202 a message from a second electronic device 300 is received. If the communication unit 202 receives a message, the procedure goes to step S306, otherwise the procedure returns to step S305.

In step S306, the analysis module 2012 parses the content of the received message. In the embodiment, the parsed content of the received message includes a communication number of the second electronic device 300 and a string.

In step S307, the matching module 2013 verifies the parsed content of the received message according to the preset unlocking request information stored in the storage unit 203, and determines whether the verification is successful, that is, determines whether the parsed content of the received message matches with the preset unlocking request information stored in the storage unit 203. In the embodiment, the preset unlocking request information includes a preset communication number and a preset string, the matching module 2013 compares the communication number, and the string included in the parsed content of the received message with the preset communication number and the preset string respectively. If the communication number and the string included in the parsed content of the received message match with the preset communication number and the preset string respectively, that is, the verification is successful, the procedure goes to step S308, otherwise the procedure returns to step S305. The user can store the preset communication number and the preset string in the second electronic device 300, in order to get back the preset password of the electronic device 200 in a timely manner.

In step S308, the marking module 2011 clear the timeout flag from the locking unit 204.

In step S309, the processing unit 201 controls the communication unit 202 to send the preset password stored in the storage unit 203 to the second electronic device having the preset communication number, and the procedure returns to step S301

In step S310, the locking unit 204 unlocks the operating system of the electronic device 200.

Thereby, the problem that users must remember the password is solved.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a storage unit configured for storing a preset password for accessing the electronic device and preset unlocking request information;
   a locking unit configured for locking or unlocking an operating system of the electronic device;
   a communication unit configured to communicate with a second electronic device; and
   a processing unit;
   wherein, when the operating system of the electronic device is locked, if the communication unit receives a message from the second electronic device, the processing unit verifies the received message according to the preset unlocking request information, and controls the communication unit to send the preset password to the second electronic device if the verification is successful, and the locking unit unlocks the operating system of the electronic device when the preset password obtained from the second electronic device is input in the electronic device.

2. The electronic device as described in claim 1, wherein the processing unit comprises:
   an analysis module configured for parsing the content of the received message; and
   a matching module configured for verifying the parsed content of the received message according to the preset unlocking request information, and determining whether the parsed content of the received message matches with the unlocking request information.

3. The electronic device as described in claim 2, wherein the preset unlocking request information includes a preset communication number and a preset string, the parsed content of the received message includes a communication number and a string, the matching module compares the communication number and the string included in the parsed content of the received message with the preset communication number and the preset string respectively, and determines the verification is successful if the parsed content of the received message matches with the unlocking request information.

4. The electronic device as described in claim 1, the electronic device further comprises a counting unit configured to record a number of times that a user inputs wrong passwords.

5. The electronic device as described in claim 4, wherein the processing unit further comprises a marking module configured for marking a timeout flag on the locking unit, if the recorded number of times reaches a predetermined number; and clearing the timeout flag from the locking unit, if the verification is successful.

6. A method for unlocking a locked operating system of an electronic device, the electronic device comprising a storage unit and a locking unit, the storage unit configured for storing a preset password for accessing the electronic device and preset unlocking request information, the method comprising:
   receiving a message from a second electronic device;
   verifying the received message according to the preset unlocking request information; and
   sending the preset password to the second electronic device if the verification is successful.

7. The method as described in claim 6, wherein the step of verifying the received message according to the preset unlocking request information comprises:
   parsing the content of the received message;
   determining whether the parsed content of the received message matches with the preset unlocking request information;
   determining that the verification is successful if the content of the received message matches with the unlocking request information.

8. The method as described in claim 7, wherein the preset unlocking request information includes a preset communication number and a preset string, the obtained content of the received message includes a communication number and a string, and the step of determining whether the parsed content of the received message matches with the unlocking request information comprises: comparing the communication number and the string included in the parsed content of the received message with the preset communication number and the preset string respectively, and determining whether the communication number and the string included in the parsed content of the received message matches with the preset communication number and the preset string respectively.

9. The method as described in claim 6, wherein before the step of receiving a message from a second electronic device, the method further comprises:
   receiving an input password;
   determining whether the input password matches with the preset password;
   if the input password is different from the preset password, determining whether a unlocking procedure for the locked operating system of the electronic device times out;

if the unlocking procedure times out, determining whether a message from a second electronic device is received.

10. The method as described in claim 9, wherein the step of determining whether a unlocking procedure for the locked operating system of the electronic device times out comprises:

recording a number of times that a user inputs wrong passwords, and determining whether the recorded number reaches a predetermined number;

if the recorded number reaches a predetermined number, determining that the unlocking procedure times out.

11. The method as described in claim 9, further comprising marking a timeout flag on the locking unit if the unlocking procedure times out.

12. The method as described in claim 11, wherein before the step of sending the preset password to the second electronic device the method further comprises:

clearing the timeout flag from the locking unit.

13. The method as described in claim 9, further comprising: unlocking the operating system of the electronic device if the input password matches with the preset password.

\* \* \* \* \*